United States Patent [19]

Groff

[11] 4,308,313

[45] Dec. 29, 1981

[54] ELECTRICAL-INSULATING PRESSURE-SENSITIVE ADHESIVE TAPE HAVING A BACKING COMPRISING A RESIN BONDED, AS OPPOSED TO A FIBER BONDED, WEB

[75] Inventor: Gaylord L. Groff, North St. Paul, Minn.

[73] Assignee: Minnesota Mining and Manufacturing Company, St. Paul, Minn.

[21] Appl. No.: 87,504

[22] Filed: Oct. 23, 1979

[51] Int. Cl.³ .......................... C09D 7/02; C09D 7/04
[52] U.S. Cl. .................... 428/284; 156/166; 156/280; 427/121; 427/208.4; 427/208.8; 427/365; 427/366; 427/369; 427/370; 427/401; 427/412; 428/286; 428/287; 428/290; 428/293; 428/294; 428/302; 428/303; 428/354

[58] Field of Search ............ 428/284, 286, 287, 290, 428/293, 294, 302, 303, 354; 156/166, 280; 427/121, 208.4, 208.8, 365, 366, 369, 370, 401, 412

[56] References Cited

U.S. PATENT DOCUMENTS

| | | | |
|---|---|---|---|
| 2,548,980 | 4/1951 | Kellgren . | |
| 2,733,169 | 1/1956 | Holmen et al. | |
| 2,750,314 | 6/1956 | Bemmels | 428/354 |
| 2,750,315 | 6/1956 | Tierney | 428/354 |
| 2,753,285 | 7/1956 | Pahl et al. | 428/354 |
| 3,027,279 | 3/1962 | Kurka | 428/324 |
| 3,309,260 | 3/1967 | Boese | 428/296 |
| 3,562,088 | 2/1971 | Newman et al. | 428/343 |
| 3,716,437 | 2/1973 | Newman et al. | 428/354 |
| 3,718,495 | 2/1973 | Tomita | 428/500 |
| 4,035,694 | 7/1977 | Barton et al. | 428/212 |

*Primary Examiner*—James C. Cannon

[57] ABSTRACT

Electrical-insulating pressure-sensitive adhesive tape, the backing of which is a web of oriented polymeric fibers impregnated with a crosslinked polymeric resin to provide a voids-volume of less than 60%.

13 Claims, 2 Drawing Figures

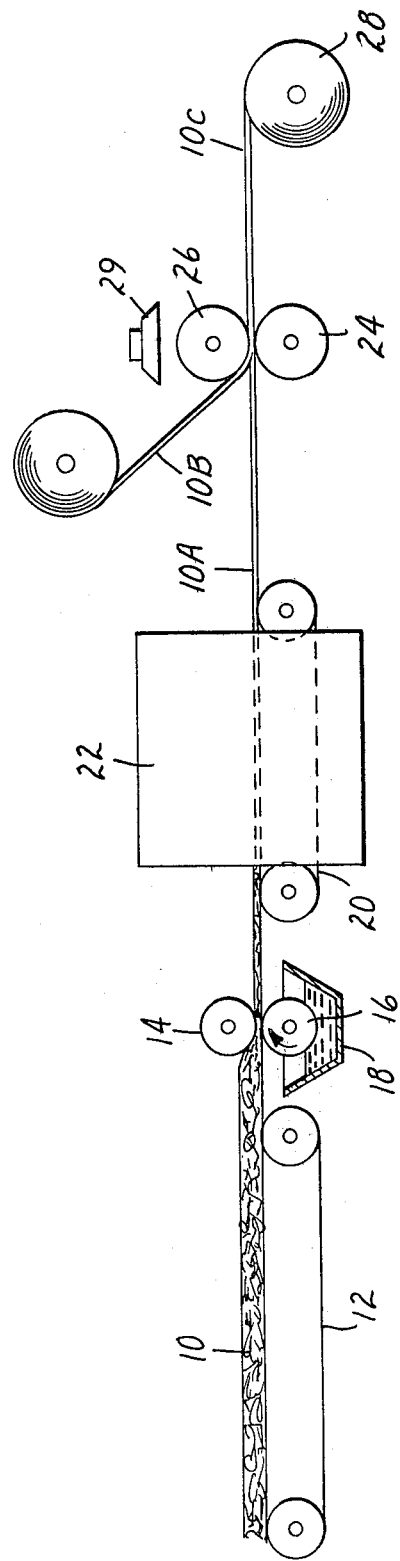
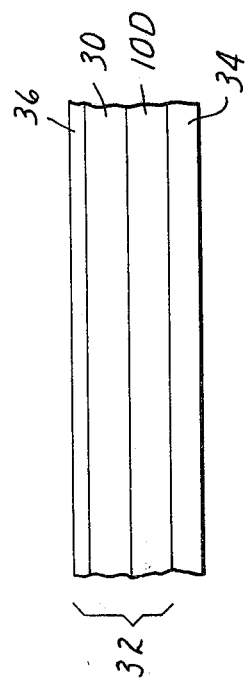
Fig. 1
Fig. 2

ELECTRICAL-INSULATING PRESSURE-SENSITIVE ADHESIVE TAPE HAVING A BACKING COMPRISING A RESIN BONDED, AS OPPOSED TO A FIBER BONDED, WEB

FIELD OF THE INVENTION

The invention relates to an improved backing for electrical-insulating pressure-sensitive adhesive tape.

BACKGROUND TO THE INVENTION

Because of their low cost, kraft and hemp papers have been widely used as backings for electrical-insulating pressure-sensitive adhesive tapes. Paper-like backings based on polymeric fibers, such as cold-drawn polyester fibers, have provided better electrical insulation, tear strength, and resistance to heat, but heretofore only at substantially increased cost. For example, U.S. Pat. No. 3,309,260 (Boese) discloses one such backing made from a randomly-intermingled mixture of cold-drawn and undrawn polyester fibers, the latter fusing under heat and pressure in order to knit the former into a coherent web. If the fiber-bonded web at this state were coated with a pressure-sensitive adhesive, it could not be wound on itself and unwound without delaminating and hence should first be unified with a resinous binder. Care must be taken in forming the web to avoid loose surface fibers which could produce an undesirable roughness after application of the resinous binder. To provide better dielectric and physical strength, a high-strength plastic film may be laminated to a paper or paper-like backing before applying a pressure-sensitive adhesive coating, but this increases the cost.

Another fibrous backing for pressure-sensitive adhesive tape is shown in U.S. Pat. No. 3,562,088 (Newman et al.). Referring to FIG. 1 of the drawing, a layer of acrylic resin 10 is cast onto a polypropylene film 12, and a carded web of polymeric fibers 14 such as nylon is laid into the acrylic resin layer. The three layers are hot-calendered between rolls 16 and 20 to provide a nonwoven fibrous backing to which a pressure-sensitive adhesive layer 22 may be applied (FIG. 3). This tape should have excellent electrical-insulating properties, but at substantially increased cost as compared to ordinary paper-backed electrical-insulating tapes.

OTHER PRIOR ART

U.S. Pat. No. 4,035,694 (Barton et al.) discloses a flexible copper-clad sheet for printed circuit use, which sheet includes a nonwoven, fibrous electrical-insulating web and an adhesive layer bonding the web to the copper foil. By selecting certain fibers and binder materials of the Barton patent and then applying sufficient heat and pressure to convert them into a densified nonwoven web, the Barton web could be used as the backing member of the present invention, although it is there preferred that the web be somewhat porous to provide better anchoring of the adhesive layer to the web, whereas the backing member of the present invention should have limited porosity.

THE PRESENT INVENTION

The present invention concerns pressure-sensitive adhesive tape which can be produced at a cost comparable to that of ordinary paper-backed pressure-sensitive adhesive tapes while providing tear strength, resistance to heat and electrical-insulating properties comparable to those of the tapes of the above-discussed patents. A desirably smooth backside surface is readily attained.

The novel pressure-sensitive adhesive tape has a flexible backing member comprising a resin-bonded web which consists essentially of (a) one or more layers of nonwoven, randomly-intermingled, electrical-insulating, oriented polymeric fibers and (b) a binder consisting essentially of a crosslinked polymeric resin. The fibers form a continuous, substantially-uniform network extending to both surfaces of the resin-bonded web which should have limited porosity, namely, a voids-volume of less than 60%. The ratio of fibers to resin in the resin-bonded web is from 1:2 to 6:1, and its thickness is 25–200 micrometers. The resin-bonded web has a tear strength of at least 2kN/m at a thickness of 75 micrometers. (Test method: TAPPI T 470 os-78). Said fibers have a denier of 1 to 8,
have a softening point of at least 200° C.,
remain essentially unchanged after exposure to 130° C. for months, and
have a tenacity of at least one gram per denier.

The crosslinked polymeric resin binder would by itself provide a self-sustaining film having a tensile strength of at least 100 psi (0.7 MPa),
being capable of being folded repeatedly upon itself without cracking,
having a dielectric strength of at least 25 volts per micrometer, and
remaining essentially unchanged after exposure to 130° C. for months.

The voids-volume of the resin-bonded web is readily calculated from density, weight and thickness measurements. Accurate thickness measurements can be made by ASTM D645 using a motor-operated micrometer (Testing Machines Inc. 549M) with a 16-mm diameter foot and a 1000-gram nominal dead-weight load.

To make the resin-bonded web of the novel tape, a fluffy web of nonwoven, randomly-intermingled, electrical-insulating fibers is simultaneously squeezed and saturated with a dispersion of a crosslinkable polymeric resin composition in a volatile vehicle. Heat is applied to drive off the vehicle, and sufficient heat and pressure are applied to crosslink the resin and to attain a voids-volume of less than 60%. Above 60%, the resin-bonded web would have inferior internal strength and if it were coated with a layer of pressure-sensitive adhesive and then wound upon itself in roll form, it might delaminate upon unwinding. Preferably the voids-volume is less than 55% to minimize pin-holes.

Because the heat and pressure under which the resin-bonded web is densified should be applied simultaneously, the crosslinkable polymeric resin composition preferably gels very quickly at high temperatures. Unless the resin begins to gel while still in contact with the surfaces applying that pressure, it would tend to stick to those surfaces.

A layer of pressure-sensitive adhesive may be applied directly to the resin-bonded web to provide the novel tape. A composite backing member of better dielectric strength may be provided by coating an electrical-insulating resin composition onto one or both faces of the resin-bonded web and drying this to a flexible, tack-free, electrical-insulating state, preferably crosslinked, before applying a layer of pressure-sensitive adhesive. This resin coating covers any pin-holes and may comprise the same resin composition as the binder of the resin-bonded web. However, the preferred compositions for the resin coating could not be used as the resin binder. Particularly preferred as the resin coating are the compositions of U.S. Pat. No. 3,027,279 (Kurka et al.). The composition of the resin coating may be selected to enhance flame retardancy.

Another means for improving the dielectric strength of the flexible backing member is to densify one or more layers of the resin-bonded web in face-to-face contact with a flexible high-strength, electrical-insulating plastic film to provide a composite backing. The plastic film should have a thickness of 10–70 micrometers,
have a softening point of at least 200° C.,
remain essentially unchanged after exposure to 130° C. for months, and
have a tensile strength in the longitudinal direction of at least 5,000 psi (35MPa), and
have a dielectric strength of at least 100 volts per micrometer.

The resistance to 180° peelback between said backing member and said plastic film should be at least 4 ounces per inch of width (0.04 kN/m).

Each of the aforementioned techniques for improving the dielectric strength significantly increases the cost of tapes of the invention above that of a paper-backed tape.

Crosslinkable polymeric resin compositions which are especially useful as the binder of the resin-bonded web are provided by an acrylic copolymer such as a copolymer of a major proportion of an unbranched or moderately branched alkyl acrylate having 1–8 carbon atoms in the alkyl group and a minor proportion of copolymerizable carboxylic acid such as acrylic acid. The acrylic monomers may be copolymerized with a minor proportion of styrene.

A preferred crosslinking agent for the acrylic copolymers is hexamethoxymethylmelamine. Water-borne dispersions of crosslinkable acrylic copolymer compositions including this crosslinking agent tend to dry quickly at 120° C. with very little crosslinking and then to crosslink to a thermoset state very quickly at 175° C. and extremely fast at 220° C. Care should be used in selecting agents for emulsifying the dispersions, many of which would provide a significant reduction in electrical-insulating properties. Emulsifying agents should also be selected to avoid corrosive characteristics.

Other useful crosslinkable polymeric binder resins include styrene-butadiene, styrene-butadiene-acrylonitrile, and vinyl acetate copolymers having pendant groups through which they may be crosslinked such as carboxyl groups.

Preferred oriented polymeric fibers for the resin-bonded web of the backing are polyesters, such as polyethylene terephthalate, and nylon polyamides, especially highly aromatic polyamides. Particularly good results have been obtained using blends of polyester and polyamide fibers, since blends have proven to be easier to process and have produced backings of higher strength at a given thickness than have unblended polyester fibers.

It would be difficult to make a resin-bonded web using fibers of less than one denier. Above a denier of about 8, it would be more difficult to attain the desired voids-volume of less than 60%.

Backings of superior strength have been obtained by bonding reinforcing strands such as continuous glass filaments to the resin-bonded web. Preferably such reinforcing filaments extend substantially the full length of the tape and are located between two layers of fibers comprising the resin-bonded web or between the resin-bonded web and a plastic film.

THE DRAWING

FIG. 1 schematically illustrates apparatus suitable for making a preferred resin-bonded web for a pressure-sensitive adhesive tape of the invention, and FIG. 2 is a schematic edge-view of a tape of the invention.

Referring to FIG. 1, nonwoven, randomly-intermingled, electrical-insulating fibers are deposited from a garnett or other carding machine (not shown) as a fluffy web 10 onto an endless carrier 12 which carries it to a pair of rolls 14, 16. The roll 16 rotates in the direction of the arrow to carry from a bath 18 to the nip of the rolls a crosslinkable polymeric resin composition in a volatile vehicle. The saturated fibers are borne by a second endless carrier 20 through an oven 22 to drive off the vehicle, thus providing a dried, handleable web 10A. A second pair of rolls, one of which 24 has a metallic surface while the other 26 is rubber-covered, densify the web 10A and an identical web 10B under heat and pressure to provide a two-layer resin-bonded web 10C which is wound upon itself into roll form at 28. The resin-bonded web 10C may later be unwound and coated with a pressure-sensitive adhesive (this not being shown) to provide a tape of the invention. Aggressive pressure-sensitive adhesives may require the application of a low-adhesion backsize coating to the other face of the tape.

The roll 24 is preferably steel and may be internally heated to provide a surface temperature of about 220°–270° C. The other roll preferably is covered with silicone rubber and may be heated both by conduction from the steel roll and by an infrared lamp 29 to provide a surface temperature of about 150°–200° C. At these operating temperatures, reasonably fast production rates should be possible since the resin should gel quickly, thus averting sticking.

If the web 10B were replaced by a high-strength, electrical-insulating plastic film 30 having a low-adhesion backsize coating 36, the resin binder of the web 10A would adhesively bond it to the plastic film to provide a composite flexible backing member 32 as illustrated in FIG. 2. A pressure-sensitive adhesive layer 34 is adhered to the other face of the resin-bonded web 10D into which the web 10A has been converted upon being densified under heat and pressure.

EXAMPLE 1

A continuous fluffy web of drawn polyethylene terephthalate polyester fibers, 1.5 inches (38 mm) long, 1.75 denier, weighing 0.58 ounce per square yard (13.7 grams per m$^2$) from a garnett machine was saturated with an aqueous acrylic resin dispersion as shown in FIG. 1. The acrylic resin was a copolymer of a major proportion of n-butyl acrylate and minor proportions of styrene and acrylic acid ("Rhoplex" P-376). The dispersion contained 7.5 parts of hexamethoxymethylmelamine ("Cymel" 303) per 100 parts of the acrylic resin. The saturated web was dried in an oven at 120° C. and wound up. The dried web weighed 0.86 ounce per square yard (20.4 grams per m$^2$), had a thickness of 6 mils (150 micrometers), and its binder resin content was 32%.

Three layers of the dried web were densified face-to-face in a heated steel-roll, silicone-rubber-roll laminator. The surface of the steel roll was heated to 470° F. (243° C.) and the surface of the rubber roll to 370° F. (188° C.). The laminating speed was 30 feet per minute, and the nip roll pressure was 250 pounds per linear inch (44.7 kg per cm). The resulting resin-bonded web was tough and well bonded and had a thickness of 4.5 mils (110 micrometers). The voids-volume was 44%.

One surface of this resin-bonded web was coated with a solution of a pressure-sensitive adhesive (cross-linkable copolymer of 98/2 isooctyl acrylate/acrylic acid) which was dried with heat to a thickness of about one mil (25 micrometers). The finished tape was wound on itself and was later unwound without delaminating the backing or offsetting of the adhesive to the backside, even though there was no low-adhesion backsize coating. Some test properties:

| Of the tape (ASTM D 1000): | |
| --- | --- |
| Breaks at | 54 lb/in (946 N/100 mm) |
| Elongation | 25% |
| Adhesion to steel | 29 oz/in (0.3 kN/m) |
| Dielectric strength | 1800 volts |
| Insulation resistance | $10^7$ megohms |

| Of the backing (TAPPI T 470 os-78): | |
| --- | --- |
| Tear strength | 11 kN/m |

EXAMPLE 2

A layer of the dried web of Example 1 was densified in face-to-face contact with a 1.3-mil (33-micrometer) biaxially-oriented polyethylene terephthalate film using the same conditions as in Example 1. The thickness of the resulting composite was 3.4 mils (85 micrometers). Its resin-bonded web was well bonded to the film, having a 180° peel value from the film of 14 ounces per inch (0.15 kN/m) as run on a Thwing-Albert tensile tester of 12 inches (305 mm) per minute jaw speed.

The web side of this composite was coated with a crosslinkable 94/6 isooctylacrylate/acrylic acid copolymer pressure-sensitive adhesive composition and dried with heat to a thickness of 1.8 mils (45 micrometers). Some test properties of the tape:

| Breaks at | 43 lb/in (753 N/100 mm) |
| --- | --- |
| Elongation | 13% |
| Adhesion to steel | 73 oz/in (0.8 kN/m) |
| Dielectric strength | 5400 volts |
| Insulation resistance | $10^6$ megohms |

As compared to an identical tape except for omission of the resin-bonded web, the tape of this Example 2 is easier to handle for many applications in that it has more body and does not curl when removed from the roll. It also has much more resistance to elongation and has high puncture resistance. It also exhibits excellent resistance to long term aging at 130° C.

EXAMPLE 3

Two layers of the dried web of Example 1 were densified face-to-face using the same conditions as in Example 1 to provide a resin-bonded web having a voids-volume of 49%. This resin-bonded web was simultaneously coated on both sides with a thermosetting resin composition based on brominated epoxidized polyester and brominated epoxy resin, followed by heating for 15 minutes at 135° C. to cure the coatings to a flexible, tack-free, flame-retardant, electrical-insulating state. The resulting composite was smooth and very flexible, having an overall thickness of 4.5 mils (110 micrometers). One face of the composite was coated with a solution of a cross-linkable rubber-resin pressure-sensitive adhesive, essentially as disclosed at Example 3 of U.S. Pat. No. 3,718,495. After drying with heat to a thickness of 1.5 mils (37 micrometers), a low-adhesion backsize coating was applied to the other face. Some test properties:

| Of the tape (ASTM D 1000): | |
| --- | --- |
| Breaks at | 46 lb/in (805 N/100 mm) |
| Elongation | 24% |
| Adhesion to steel | 40 oz/in (.44 kN/m) |
| Dielectric strength | 7000 volts |
| Insulation resistance | $10^7$ megohms |

| Of the backing (TAPPI T 470 os-78): | |
| --- | --- |
| Tear strength | 9 kN/m |

I claim:

1. Electrical-insulating pressure-sensitive adhesive tape comprising a flexible backing member and a pressure-sensitive adhesive layer, said flexible backing member comprising a resin-bonded, as opposed to fiber-bonded, web which consists essentially of (a) at least one layer of nonwoven, randomly-intermingled, electrical-insulating oriented polymeric fibers and (b) a binder consisting essentially of a crosslinked polymeric resin, which fibers form a continuous, substantially uniform network extending to both surfaces of the resin-bonded web, the resin-bonded web having a ratio of the fibers to the resin from 1:2 to 6:1, a voids-volume of less than 60%, a thickness of 25–200 micrometers, and a tear strength of at least 2 kN/m at a thickness of 75 micrometers, said fibers having a denier of 1 to 8,
 having a softening point of at least 200° C.,
 remaining essentially unchanged after exposure to 130° C. for months, and
 having a tenacity of at least one gram per denier;
said crosslinked polymeric resin binder would by itself provide a self-sustaining film which
 has a tensile strength of at least 100 psi (0.7 MPa),
 is capable of being folded repeatedly upon itself without cracking,
 has a dielectric strength of at least 25 volts per micrometer, and
 remains essentially unchanged after exposure to 130° C. for months.

2. Pressure-sensitive adhesive tape as defined in claim 1 wherein there is bonded to the outer face of said backing member a plastic film which
 has a thickness of 10–70 micrometers,
 has a softening point of at least 200° C.,
 remains essentially unchanged after exposure to 130° C. for months,
 has a tensile strength in the longitudinal direction of at least 35 MPa, and has a dielectric strength of at least 100 volts per micrometer.

3. A pressure-sensitive adhesive tape as defined in claim 1 wherein there is a coating of a flexible, tack-free, electrical-insulating resin on one or both faces of said resin-bonded web.

4. A pressure-sensitive adhesive tape as defined in claim 1 further including reinforcing strands bonded to said backing member and extending substantially the full length of the tape.

5. A pressure-sensitive adhesive tape as defined in claim 4 wherein said resin-bonded web contains at least two of said layers of nonwoven fibers and said reinforcing strands are sandwiched between the fiber layers.

6. A pressure-sensitive adhesive tape as defined in claim 5 wherein there is a coating of a flexible, tack-free, electrical-insulating resin on one or both faces of said resin-bonded web.

7. A pressure-sensitive adhesive tape as defined in claim 1 wherein the crosslinked polymeric resin is an acrylic copolymer.

8. A pressure-sensitive adhesive tape as defined in claim 1 which is wound upon itself in roll form.

9. The method of making an electrical-insulating pressure-sensitive adhesive tape comprising the steps of
(1) forming a fluffy web of non-woven, randomly-intermingled, electrical-insulating, oriented polymeric fibers which
   have a denier of 1–8,
   have a softening point of at least 200° C.,
   remain essentially unchanged under exposure to 130° C. for months, and
   have a tenacity of at least one gram per denier;
(2) simultaneously squeezing and saturating the fluffy web with a dispersion of a crosslinkable polymeric resin in a volatile vehicle, which resin by itself is capable of forming a self-sustaining film which
   has a tensile strength of at least 100 psi (0.7 MPa),
   is capable of being folded repeatedly upon itself without cracking,
   has a dielectric strength of at least 25 volts per micrometer, and
   remains essentially unchanged after exposure to 130° C. for months;
(3) then heating to drive off the vehicle to provide a dried handleable web having a ratio of the fibers to the resin from 1:2 to 6:1;
(4) densifying the dried web under heat and pressure to a voids-volume of less than 60% and a thickness of 25–200 micrometers, the heat being sufficient to crosslink the polymeric resin binder to provide a resin-bonded, as opposed to fiber-bonded, web; and
(5) applying a layer of pressure-sensitive adhesive to the resin-bonded web to provide an electrical-insulating pressure-sensitive adhesive tape.

10. Method as defined in claim 9, in step (4) of which at least two said dried webs are densified face-to-face to provide a multi-layer resin-bonded web.

11. Method as defined in claim 9, in step (4) of which said dried web is densified face-to-face with a high-strength, electrical-insulating plastic film to provide a unified flexible backing member, and in step (5) the pressure-sensitive adhesive layer is applied to the exposed face of the resin-bonded web.

12. Method as defined in claim 9, wherein between steps (4) and (5), an electrical-insulating resin composition is coated onto at least one face of the resin-bonded member and dried to a flexible, tack-free, electrical-insulating state.

13. Electrical-insulating pressure-sensitive adhesive tape comprising a flexible backing member and a pressure-sensitive adhesive layer, said flexible backing member comprising a resin-bonded, as opposed to fiber-bonded, web which comprises (a) at least one layer of nonwoven, randomly-intermingled, electrical-insulating, oriented polymeric fibers and (b) a polymeric resin binder, which fibers form a continuous, substantially uniform network extending to both surfaces of the resin-bonded web and
   have a denier of 1 to 8,
   have a softening point of at least 200° C.,
   remain essentially unchanged after exposure to 130° C. for months, and
   have a tenacity of at least one gram per denier; characterized in that
said polymeric resin binder is a crosslinked polymeric resin which would by itself provide a self-sustaining film which
   has a tensile strength of at least 0.7 MPa,
   is capable of being folded repeatedly upon itself without cracking,
   has a dielectric strength of at least 25 volts per micrometer, and
   remains essentially unchanged after exposure to 130° C. for months, and
said resin-bonded web having
   a ratio of fibers to resin from 1:2 to 6:1,
   a thickness of 25 to 200 micrometers, and
   a tear strength of at least 2 kN/m at a thickness of 75 micrometers.

* * * * *